United States Patent [19]
Funamoto et al.

[11] Patent Number: 5,623,505
[45] Date of Patent: Apr. 22, 1997

[54] APPARATUS FOR DETECTING PRESENCE OF INFORMATION DATA FOR USE IN RECORDING MEDIUM PLAYING APPARATUS

[75] Inventors: Kyota Funamoto; Takashi Morimae; Ken Masui, all of Tokorozawa, Japan

[73] Assignee: Pioneer Electronic Corporation, Tokyo, Japan

[21] Appl. No.: 338,789

[22] Filed: Nov. 8, 1994

Related U.S. Application Data

[63] Continuation of Ser. No. 905,390, Jun. 29, 1992, abandoned.

[30] Foreign Application Priority Data

Jan. 7, 1992 [JP] Japan .................. 4-001019

[51] Int. Cl.$^6$ .................................................. G11C 29/00
[52] U.S. Cl. .................................................. 371/40.1
[58] Field of Search ........................ 371/40.1, 40.2, 371/40.3, 40.4

[56] References Cited

U.S. PATENT DOCUMENTS

| | | | |
|---|---|---|---|
| 4,534,031 | 8/1985 | Jewer | 371/40.1 |
| 4,562,578 | 12/1985 | Okada et al. | 371/37.2 |
| 4,577,319 | 3/1986 | Takeuchi et al. | 371/40.3 |
| 4,799,221 | 1/1989 | Fukami et al. | 371/40.2 |
| 4,975,915 | 12/1990 | Sako et al. | 371/37.4 |
| 4,993,028 | 2/1991 | Hillis | 371/39.1 |
| 4,998,252 | 3/1991 | Suzuki et al. | 371/37.5 |
| 5,299,208 | 3/1994 | Blaum et al. | 371/38.1 |

*Primary Examiner*—Robert W. Beausoliel, Jr.
*Assistant Examiner*—Phillip Vales
*Attorney, Agent, or Firm*—Sughrue, Mion, Zinn, Macpeak & Seas

[57] ABSTRACT

An information data detecting apparatus for use in a recording medium playing apparatus detects the presence/absence of information data under software control using an error correction code. The information data detecting apparatus acquires a read signal representing the contents of a specified sector, extracts digital data from the read signal, performs an error-correcting operation on the extracted digital data and produces an error-correctable indicating flag when error correction is possible. When detecting the presence of the error-correctable indicating flag, the information data detecting apparatus produces a written-state signal indicating that the specified sector is used.

9 Claims, 8 Drawing Sheets

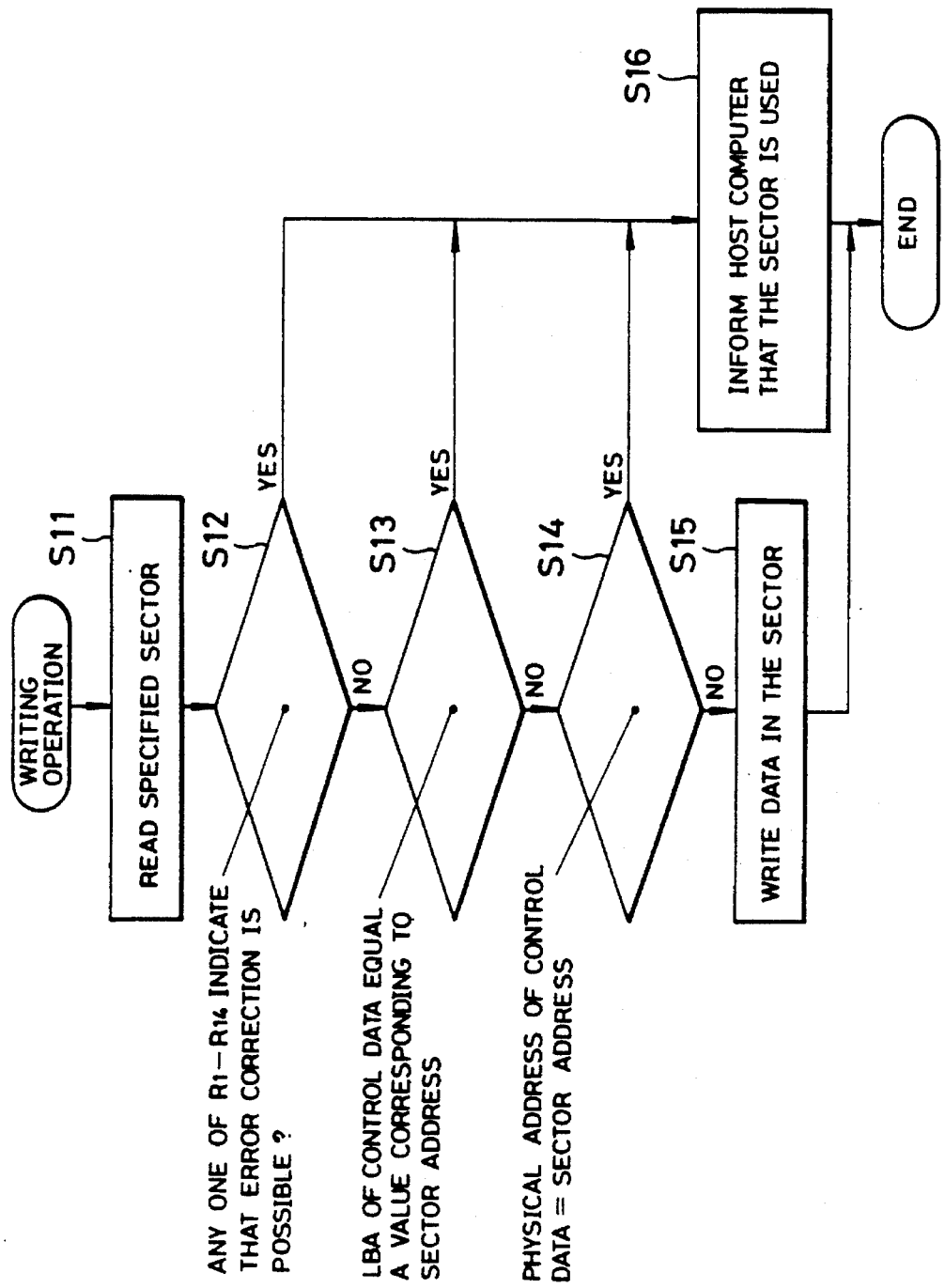

APPARATUS FOR DETECTING PRESENCE OF INFORMATION DATA FOR USE IN RECORDING MEDIUM PLAYING APPARATUS

This is a continuation of application No. 07/905,390 filed Jun. 29, 1992, now abandoned.

BACKGROUND OF THE INVENTION

1. Field of the Invention

The present invention generally relates to a recording medium playing apparatus for performing data writing/reading access to a recording medium having a plurality of sectors, and, more particularly, to an information data detecting apparatus for use in a recording medium playing apparatus, which prevents data overwriting at the time data is written on a recording medium.

2. Description of the Background Information

In an information recording/reproducing system, information is divided into certain units called blocks or sectors and information is recorded or reproduced unit by unit. For instance, data is recorded on a recording medium in a recording image as shown in FIG. 1.

Referring to FIG. 1, the sector address portion represents the physical address of a sector on the recording medium. The flag portion serves to indicate if this sector is a data-written sector, a defective or bad sector, or a data-erased sector. The user data portion is where user's information data is to be recorded. The buffer portion is provided to prevent the head of the sector address portion from being overwritten when data is recorded in the data portion even if some kind of physical change occurs on the recording medium.

In writing data on a recording medium, it is necessary to previously discriminate whether data has already been recorded on a sector in order to inhibit data overwriting.

Conventionally, as shown in FIG. 2, the flag portion in each sector of a recording medium is provided with a written flag (WRITTEN FLAG) that represents if data is written in this sector, so that the set/reset status of this flag is checked before data writing to prevent data overwriting. Alternatively, a target sector for data writing is traced before data writing to check if data is present in this sector using a hardware means for detecting the presence/absence of an information signal or by detecting a sync signal (block sync) in user data.

FIG. 3 presents a flowchart illustrating a sequence of steps for recording data in a sector by a method that detects if data is written in that sector by checking the presence or absence of the written flag.

First, a sector specified by a write command is searched by its sector address (step S31). Then, it is checked if the written flag is set in the sector searched in step S31 (step S32). When no written flag is set in step S32, that sector is judged to be a data-unwritten or unused sector, and data is written in the sector (step S33). When the written flag is found set in step S32, that sector is judged to be a data-written or used sector, and information to that effect is given to a host computer (step S34).

FIG. 4 presents a flowchart illustrating a sequence of steps to record data in a sector by a method of tracing the target sector before data writing and checking if data is present in this sector using a hardware-based information-signal detecting means.

First, a sector specified by a write command is traced to acquire an information signal (step S41). Then, it is checked if data is present in that sector from the acquired information signal (step S42). When no data is present in step S42, that sector is judged to be an unused sector, and data is written in the sector (step S43). When data is present in step S42, that sector is judged to be a used sector, and information to that effect is given to a host computer (step S44).

FIG. 5 presents a flowchart illustrating a sequence of steps to record data in a sector by a method of tracing the target sector before data writing and detecting a block sync to check if data is present in this sector.

First, a sector specified by a write command is traced to acquire an information signal (step S51). Then, the number of block syncs is checked from the acquired information signal (step S52). When the number of block syncs is less than a predetermined number, that sector is judged to be an unused sector, and data is written in the sector (step S53). When the number of block syncs is greater than the predetermined number, that sector is judged to be a used sector, and information to that effect is given to a host computer (step S54).

According to the first conventional method of detection if data is written in a sector by checking the presence or absence of the written flag, since no error check code is affixed to the written flag itself, the detection of the written flag is not sufficiently accurate. That is, if no written flag is set in an unused sector but the written flag is erroneously detected as present due to noise or the like, no error correction will be performed and no data will be written in that sector. Further, the recording capacity is inevitably reduced by the written flag.

According to the second conventional method of tracing the target sector before data writing and checking if data is present in this sector using a hardware-based information-signal detecting means, the information-signal detecting means should be realized by hardware, thus increasing the number of required circuit components. The hardware-based information-signal detecting means sends out a signal indicating the presence of data only when the information as shown in FIG. 6, which appears when a used sector is traced, reaches a predetermined threshold level. As the level of an information signal in the data portion is not uniform, however, it is difficult to determine the threshold level. What is more, data that has been recorded at a low level may not be detected for some reasons.

The third conventional method of tracing the target sector before data writing and detecting a block sync to check if data is present in this sector cannot be employed in a system such as the sampled servo system where a block sync is pre-formatted.

SUMMARY OF THE INVENTION

It is therefore an object of the present invention to provide a recording medium playing apparatus which does not have the above shortcomings and can detect the presence/absence of information data under software-based control using an error correction code, and an apparatus for detecting the presence/absence of information data therefor.

An information data detecting apparatus for use in a recording medium playing apparatus according to the present invention comprises a read means for reading a read signal representing contents of a specified sector; an error correcting means for extracting digital data from the read signal, performing an error-correcting operation on the extracted digital data and producing an error-correctable indicating flag when error correction is possible; and a written-state detecting means for producing a written-state signal indicating that the specified sector is used when the error-correctable indicating flag is detected.

BRIEF DESCRIPTION OF THE DRAWINGS

FIG. 11 is a flowchart illustrating how information data is written according to the present invention.

DETAILED DESCRIPTION OF THE PREFERRED EMBODIMENT

A preferred embodiment of the present invention will now be described referring to the accompanying drawings.

Figure 1:
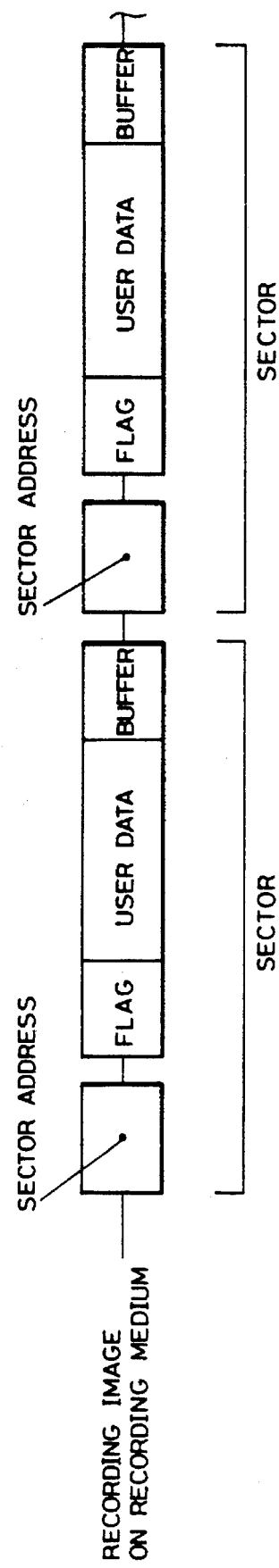
FIG. 1 is a diagram illustrating a recording format on a recording medium.
Figure 2:
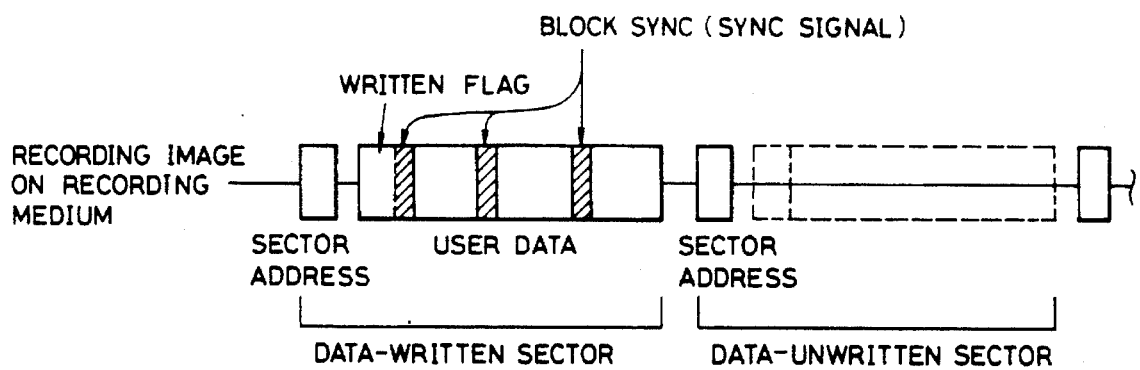
FIG. 2 is a diagram showing a conventional recording format on a recording medium.
Figure 3:
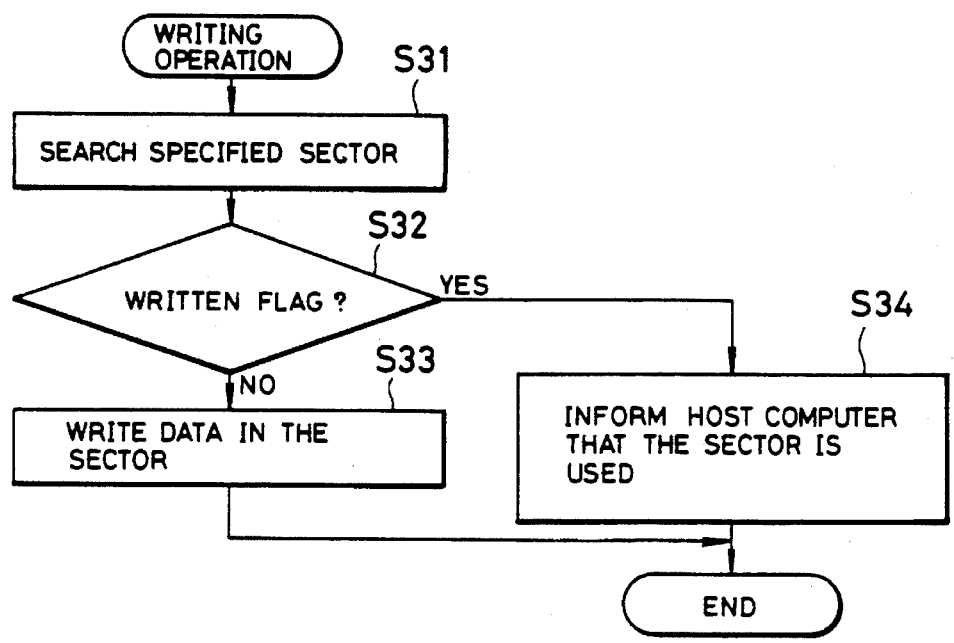
FIGS. 3, 4 and 5 are flowcharts illustrating information data writing according to prior arts.
Figure 4:
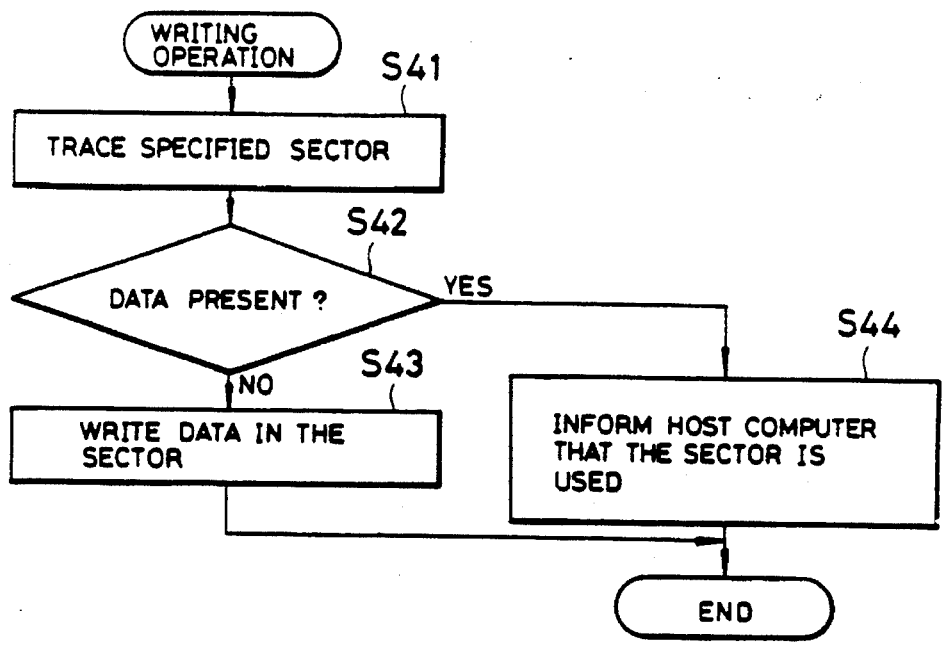
Figure 5:
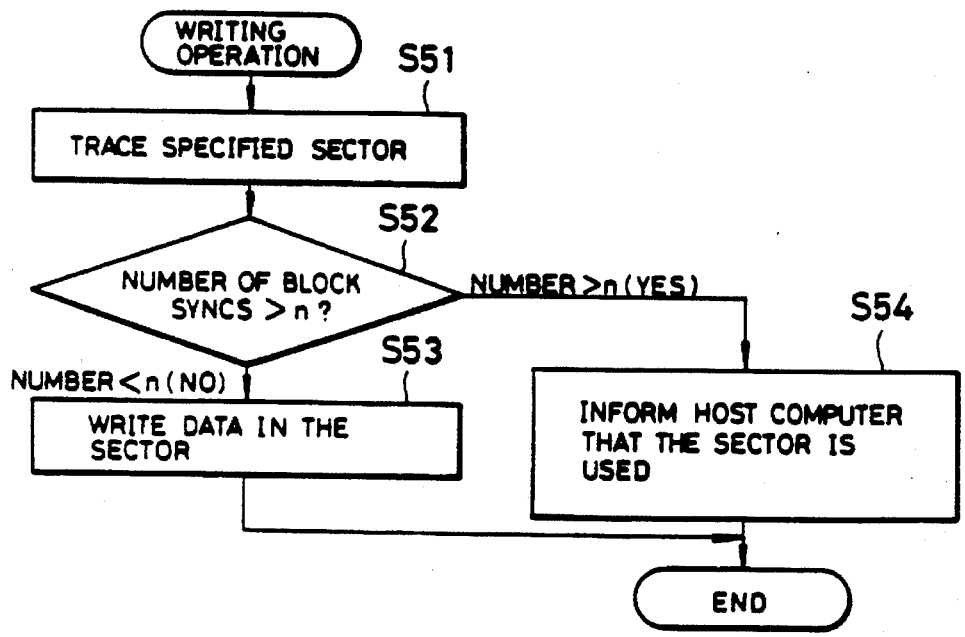
Figure 6:
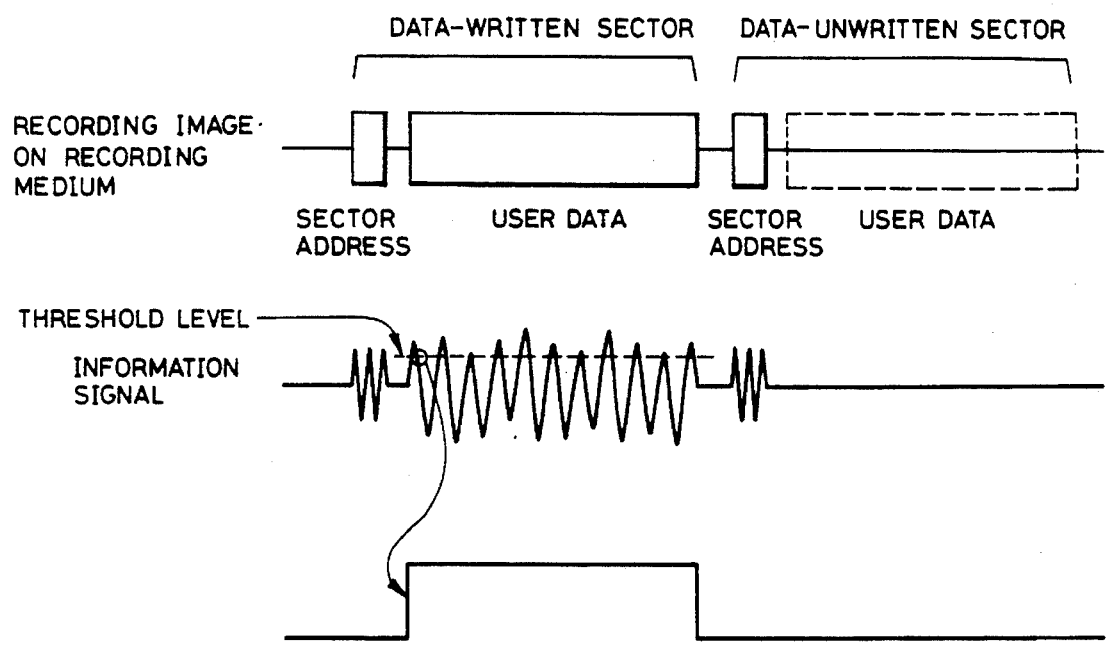
FIG. 6 is a diagram for explaining conventional hardware-based detection of the presence/absence of information data.
Figure 7:
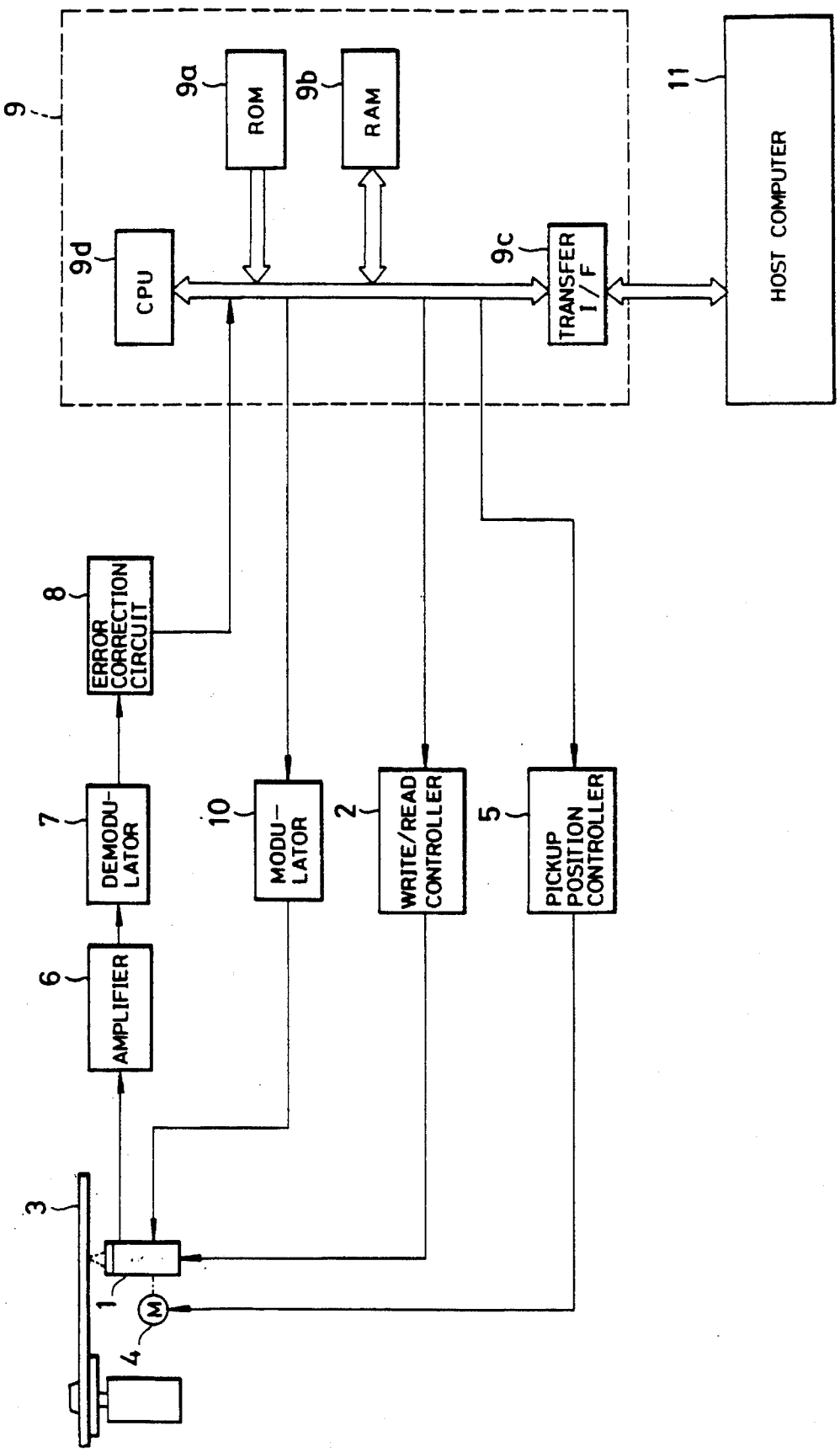
FIG. 7 is a block diagram of an information data detecting apparatus in a recording medium playing apparatus according to the present invention.

FIG. 7 presents a block diagram showing a recording medium playing apparatus including an information data detecting apparatus embodying the present invention. In this recording medium playing apparatus, a pickup 1 writes information on or reads information from an optical disk 3 as a recording medium in accordance with a signal from a write/read controller 2. A slider motor 4 is driven in response to a signal from a pickup position controller 5 to move the pickup 1 to a predetermined position. The pickup 1 is provided with a fine tracking servo unit, which will not be discussed below. When the pickup 1 is reading data, an information signal read out is converted into digital data by an amplifier 6 and a demodulator 7 before it is sent to an error correcting circuit 8. The error correcting circuit 8 performs error correction on the received data, and produces an error-correctable indicating flag that indicates if error correction is possible and sends it to a player controller 9. When the pickup 1 is writing data, digital data supplied from the player controller 9 is supplied via a modulator 10 to the pickup 1. The player controller 9 controls a pickup position controller 5 as well as the write/read controller 2.

The player controller 9, which is connected to a host computer 11, comprises a ROM (Read Only Memory) 9a in which various processing programs and necessary information are previously written, a RAM (Random Access Memory) 9b accessible for writing and reading necessary information to run a program, a transfer interface (I/F) circuit 9c for data exchange between the player controller 9 and the host computer 11, and a CPU (Central Processing Unit) 9d which controls the operation of the recording medium playing apparatus in accordance with the various processing programs written in the ROM 9a.

Figure 8:
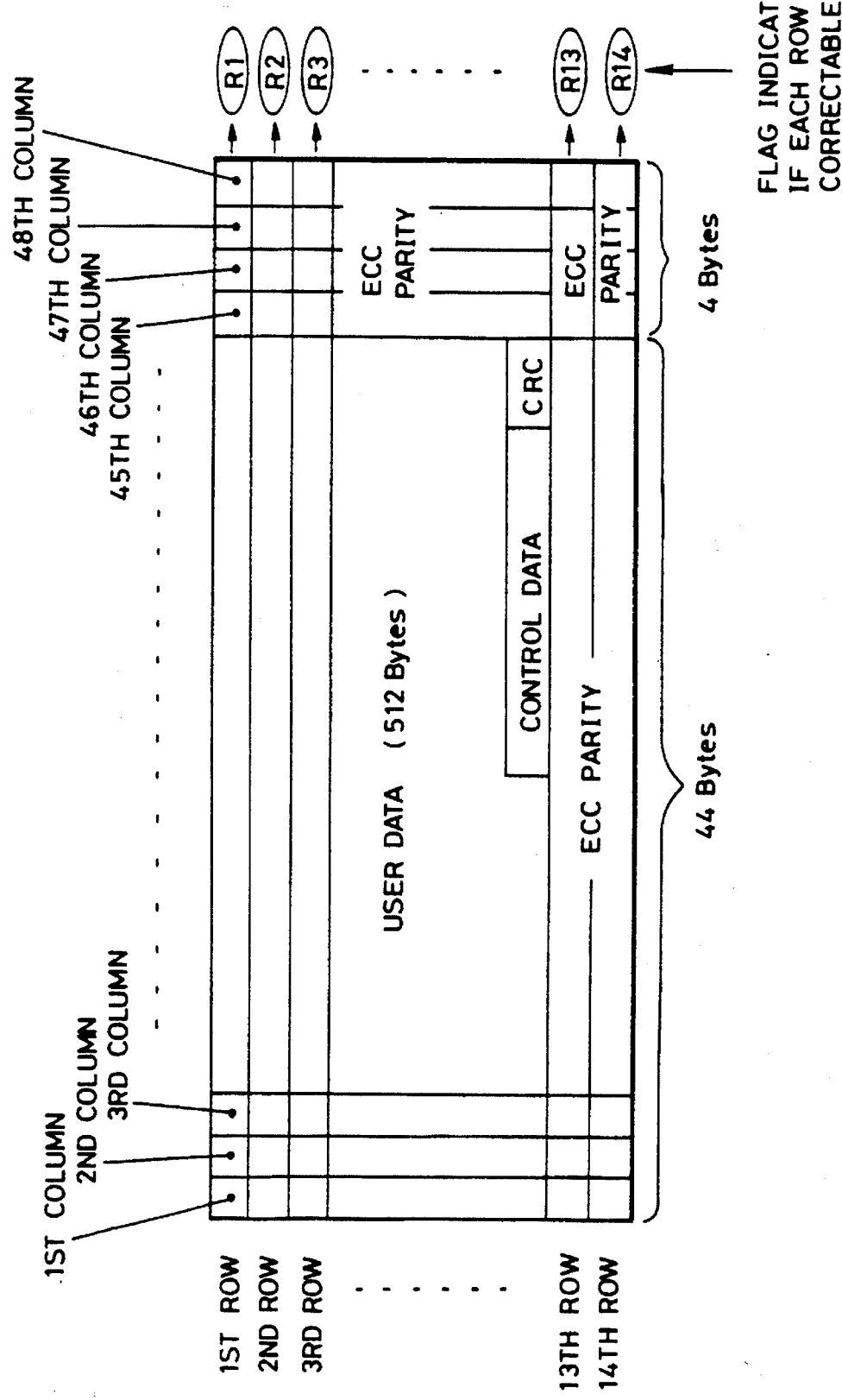
FIG. 8 is a diagram showing a sector format.

In this recording medium playing apparatus, recording tracks are divided into certain units called blocks or sectors by means of pre-pits, pre-addresses or the like, and recording/reproduction of information is executed unit by unit. The sampled servo system is one example of this system. FIG. 8 exemplifies the data recording format in one sector. In this diagram, the user data area is where information a user wants to reproduce is to be recorded, and the ECC parity and CRC are redundancy words for error correction and detection. The control data area is where information for permitting information to be written in another sector than a target sector for data writing when this target sector is bad, is recorded. As shown, the sector is arranged 48 columns (one byte per column) by 14 rows.

Figure 9:
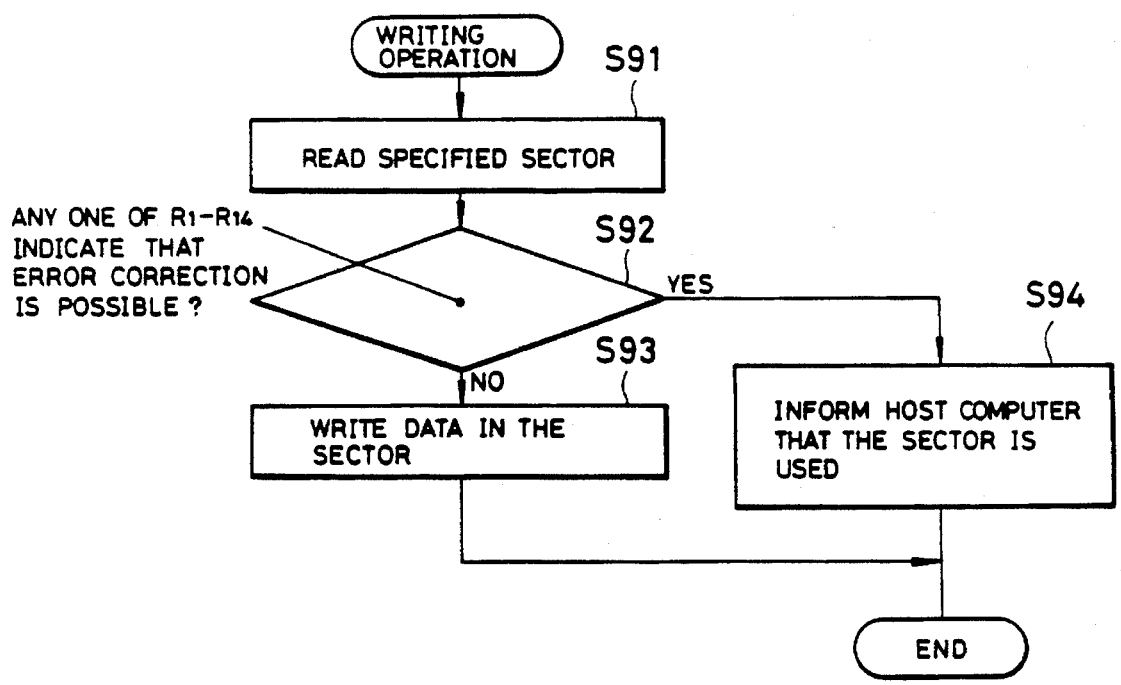
FIG. 9 is a flowchart illustrating how information data is written according to the present invention.

FIG. 9 presents a flowchart illustrating steps of writing arbitrary data in a given sector on a recording medium, which are executed by the CPU 9d. A sequence of steps of the operation to a system having the sector format shown in FIG. 8 will be described below referring to FIG. 7.

First, the player controller 9 fetches a command for data writing, data to be written (hereinafter referred to as "write data") and write address from the host computer 11. The CPU 9d stores the write data and write address into the RAM 9b, and sends a control signal to the write read controller 2 and pickup position controller 5 to read the sector at that address from the optical disk 3. In response to the control signal, the pickup position controller 5 drives the slider motor 4 to move the pickup 1 to the position where that sector exists. Then, the write read controller 2 sets the pickup 1 ready for data reading. An information signal read out from the pickup 1 is supplied via the amplifier 6 and demodulator 7 before being provided to the error correcting circuit 8. The error correcting circuit 8 performs error correction on the information signal, and sends the corrected information data to the player controller 9. That is, based on a code word consisting of a 44-byte data train and a 4-byte ECC parity affixed thereto, the error correcting circuit 8 performs error check and correction in the horizontal (row) direction to check the occurrence of an error and the position of the error if any, row by row from the first row to the 14-th row as shown in FIG. 8, and then correct the error in the error-occurred row. In the above process, the error correcting circuit 8 produces a flag Ri indicating if an error in the i-th row has been corrected every time the error correction for the i-th row is completed, and sends flags R1 to R14 for the first row to the 14-th row to the player controller 9. Next, the error correcting circuit 8 likewise performs error check and correction in the vertical (column) direction column by column. After the error correction for all the rows and columns is completed, the CPU 9d fetches the corrected information data and the flags R1 to R14 into the RAM 9b and reads the specified sector (step S91). Then, the CPU 9d checks if the flags R1 to R14 include any flag indicating that error correction is possible (step S92). When there is no such flag found in step S92, the CPU 9d judges the sector in question as an unused sector, and sends a control signal to the write read controller 2 and pickup position controller 5 to write the aforementioned write data into that sector. In response to the control signal, the pickup position controller 5 drives the slider motor 4 to move the pickup 1 to the position of that sector. Then, the write read controller 2 sets the pickup 1 ready for data writing. Next, the CPU 9d sends the write data to the modulator 10. The write data modulated by the modulator 10 is supplied to the pickup 1 to be written on the optical disk 3 (step S93). When there is any flag found in step S92 which indicates that error correction is possible, the specified sector is judged as a used sector, and information to that effect is given to the host computer (step S94).

Figure 10:
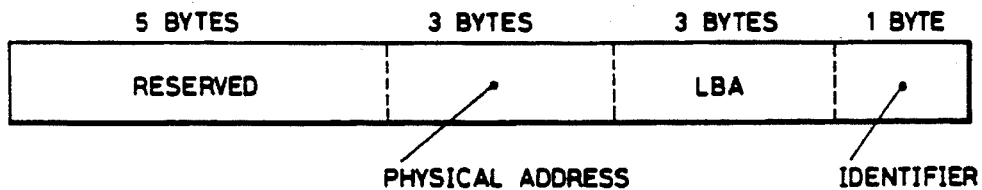
FIG. 10 is a diagram showing a control data format.

The control data in FIG. 8 consists of 12 bytes in total: a 5-byte reserved area (RESERVED), a 3-byte physical sector address (PHYSICAL ADDRESS), a 3-byte logical block address (LBA) and a 1-byte identifier (IDENTIFIER) as shown in FIG. 10. When information is written in a sector, the address for this sector is written in the physical sector address field or logical block address field of the control data. As an auxiliary means for judgment on the status of a sector using the flags R1 to R14, the physical sector address or logical block address of data is compared with the address of the sector in question and, when those addresses match each other, this sector can be judged as a used sector even if the flags R1 to R14 all indicate that errors are uncorrectable. With all of the row-correction flags R1 to R14 indicating that error correction is not possible, although error judgment of a single byte of data in the sector cannot be made accurately, with the byte error ratio of $10^{-3}$, the probability P that three bytes in the control data match those of the specified sector and that judgment is wrong is expressed as follows.

$P$ = (probability that matching with the target values occurs even when the first byte is wrong) × (probability that matching with the target values occurs even when the second byte is wrong) × (probability that matching with the target values occurs even when the third byte is wrong) =

$$\frac{10^{-3}}{256} \times \frac{10^{-3}}{256} \times \frac{10^{-3}}{256} \ll 10^{-12}$$

From the above, the specified sector can be judged as a used sector if the control data matches the associated data of the specified sector even when R1 to R14 do not indicate that error correction is possible.

FIG. 11 presents a flowchart illustrating steps added with the above-described method of detection the presence or absence of information data using the control data. The operation along this flowchart will be described below referring to FIG. 7.

First, a command for data writing, write data and write address are input from the host computer 11. The CPU 9d stores the write data and write address into the RAM 9b, and sends a control signal to the write read controller 2 and pickup position controller 5 to read the sector at that address from the optical disk 3. In response to the control signal, the pickup position controller 5 drives the slider motor 4 to move the pickup 1 to the position of that sector. Then, the write read controller 2 sets the pickup 1 ready for data reading. An information signal read out from the pickup 1 is supplied via the amplifier 6 and demodulator 7 before to the error correcting circuit 8. The error correcting circuit 8 performs error correction on the information signal, and sends the corrected information data to the player controller 9. Based on a code word consisting of a 44-byte data train and a 4-byte ECC parity affixed thereto, the error correcting circuit 8 performs error check and correction in the horizontal (row) direction to check the occurrence of an error and the position of the error if any, row by row from the first row to the 14-th row as shown in FIG. 8, and then correct the error in the error-occurred row. At this time, the error correcting circuit 8 produces a flag Ri indicating if an error in the i-th row has been corrected upon each completion of the error correction for the i-th row, and sends flags R1 to R14 for the first row to the 14-th row to the player controller 9. Next, the error correcting circuit 8 likewise performs error check and correction in the vertical (column) direction column by column. After the error correction for all the rows and columns is completed, the CPU 9d fetches the corrected information data and the flags R1 to R14 into the RAM 9b and reads the specified sector (step S11).

Then, the CPU 9d checks if the flags R1 to R14 include any flag indicating that error correction is possible (step S12). When there is no such flag found in step S12, the CPU 9d compares the logical block address of the control data with the address of the specified sector (step S13). When judging the logical block address of the control data as different from the correct value corresponding to the address of that sector in step S13, the CPU 9d compares the physical sector address of the control data with the address of the sector (step S14). When the physical sector address is found different from the address of the sector in step S14, the CPU 9d judges this sector as an unused sector, and sends a control signal to the write read controller 2 and pickup position controller 5 to write the aforementioned write data into that sector. In response to the control signal, the pickup position controller 5 drives the slider motor 4 to move the pickup 1 to the position of that sector. Then, the write read controller 2 sets the pickup 1 ready for data writing. Next, the CPU 9d sends the write data to the modulator 10. The write data modulated by the modulator 10 is supplied to the pickup 1 to be written on the optical disk 3 (step S15). When there is any flag found in step S12 which indicates that error correction is possible, or when the logical block address of the control data is judged as the correct value corresponding to the address of the specified sector in step S13 or the physical sector address is judged equal to the address of that sector in step S14, this sector is judged as a used sector, and information to that effect is given to the host computer (step S16).

As described above, the information data detecting apparatus according to the present invention is controlled by the CPU 9d or is controlled by software.

In short, since the information data detecting apparatus according to the present invention is realized only by software-based control, the number of hardware components will not be increased for the designed purpose. In addition, error-corrected information data is used to detect the presence/absence of information data, thus ensuring high detection accuracy.

What is claimed is:

1. An information data detecting apparatus for use in a recording medium playing apparatus for executing data writing and reading to a recording medium having a plurality of sectors, sector by sector, comprising:

means for writing address data, representing an address of said specified sector, in at least one data field of a specified sector when data is written in said specified sector;

reading means for reading, upon receipt of a writing instruction indicating that additional data is to be written to said specified sector, contents of said specified sector and providing a read signal representing said contents of said specified sector, each of said sectors being identified by an address and having at least one data field;

error correcting means for extracting digital data from the read signal, performing an error-correcting operation on the extracted digital data, producing an error-correctable indicating flag when error correction is possible, and producing a non-error-correctable flag when error correction is not possible; and means for performing the following operations:

producing a written-state signal indicating that the specified sector is used when the error-correctable indicating flag is detected;

comparing, in response to issuance of said non-error-correctable flag, first data representing the address of said specified sector with a portion of said read signal representing said address data stored in said at least one data field of said specified sector and providing an equal signal when said first data equals said stored address data; and producing, in response to said equal signal and before said additional data is written to said specified sector, a second written-state signal indicating that data, other than said address data, is stored in said specified sector.

2. An apparatus as claimed in claim 1, wherein:

said address data is stored in two of said data fields; and said means for performing provides said equal signal when said first data represents said address data stored in either of said two data fields.

3. An apparatus as claimed in claim 1, wherein said address data is stored in two of said data fields, a first of said data fields being a physical sector address field and a second of said data fields being a logical block address field.

4. An information data detecting apparatus for use in a recording medium playing apparatus for executing data writing and reading to a recording medium having a plurality of sectors, sector by sector, comprising:

means for writing address data, representing an address of a specified sector, in said at least one data field of a specified sector when data is written in said specified sector;

reading means for reading, upon receipt of a writing instruction indicating that additional data is to be written to said specified sector, contents of said specified sector and providing read signals representative thereof, each of said sectors being identified by an address and comprising a plurality of data bytes arranged in rows and columns, some of said plurality of data bytes of each of said sectors being designated as a logical block address field, said reading means reading said contents of said specified sector row by row and column by column, and providing a read signal for each row and column read;

error correcting means for extracting digital data from the read signals and performing an error-correcting operation on the extracted digital data, such that the extracting and error correcting is performed on a row by row and column by column basis, said error correcting means producing an error-correctable indicating flag for each row in which error correction is possible, and producing a non-error-correctable flag when error correction is not possible; and means for performing the following operations:

producing a written-state signal indicating that the specified sector is used when any said error-correctable indicating flag is detected;

comparing, in response to issuance of said non-error-correctable flag, first data representing the address of said specified sector with a portion of said read signal representing said address data stored in said logical block address field of said specified sector and providing an equal signal when said first data equals said stored address data; and producing, in response to said equal signal and before said additional data is written to said specified sector, a second written-state signal indicating that data, other than said address data, is stored in said specified sector.

5. An apparatus as claimed in claim 4, wherein:

some of said plurality of data bytes of each of said sectors are designated as a physical sector address field;

said writing means further stores said address data representing an address of said specified sector in said physical sector address field of said specified sector when data is written in said specified sector; and said means for performing further compares said first data representing an address of said specified sector with said address data stored in said physical sector address field of said specified sector when said first data does not equal said stored address data stored in said logical block address field, and further provides said equal signal when said first data equals said address data stored in said physical sector address field.

6. An information data detecting apparatus as claimed in claim 1, wherein said data other than said address data is user data.

7. An information data detecting apparatus as claimed in claim 1, wherein said data other than said address data is user data.

8. An information data detecting apparatus as claimed in claim 1, wherein by indicating that said data other than said address data is stored in said specified sector, said second written-state signal indicates that said specified sector contains user data.

9. An information data detecting apparatus as claimed in claim 4, wherein by indicating that said data other than said address data is stored in said specified sector, said second written-state signal indicates that said specified sector is used.

* * * * *